Dec. 11, 1945.  H. CARLETON  2,390,508
THYRATRON INVERTERS
Filed Aug. 4, 1943
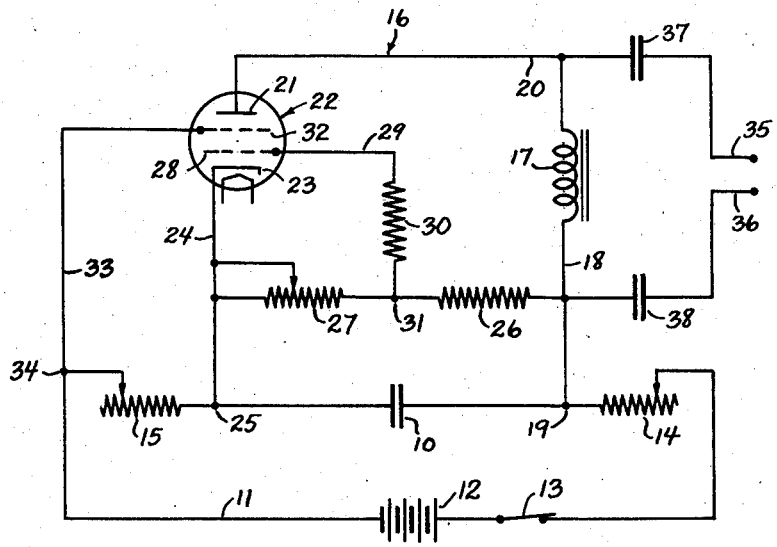
INVENTOR.
Henry Carleton
BY
ATTORNEY Patented Dec. 11, 1945

2,390,508

UNITED STATES PATENT OFFICE 2,390,508

THYRATRON INVERTER

Henry Carleton, Washington, D. C.

Application August 4, 1943, Serial No. 497,412

2 Claims. (Cl. 315—237)

(Granted under the act of March 3, 1883, as amended April 30, 1928; 370 O. G. 757)

The invention relates to improvements in Thyratron inverters and more particularly to an improved self-excited relaxation inverter.

An important object of the invention is to provide a self-excited relaxation inverter of high output voltage, adjustable frequency, and high stability with relatively few parts.

Another object of the invention is the provision of a self-excited relaxation inverter utilizing the controlling characteristics of both grids of a four-electrode Thyratron.

A further object of the invention is the provision of a self-excited relaxation inverter operable from a single source of direct current.

Other objects and advantages of the invention will become apparent during the course of the following detailed description, taken in connection with the accompanying drawing, forming a part of this specification, and in which drawing, The single figure is a diagrammatic view of the improved self-excited relaxation inverter.

In the drawing, which shows only a preferred embodiment of the invention, the numeral 10 designates the condenser of a condenser charging circuit 11 energized by a suitable source 12 of direct current as by closing a switch 13. Interposed in the condenser charging circuit between the condenser 10 and the positive and negative sides of the direct current source 12 are variable resistors 14, 15, the value of the resistor 14 being many times greater than that of the resistor 15.

The condenser 10 also forms part of an oscillatory circuit 16 including an inductance 17 having one side connected, as by conductor 18, to the condenser charging circuit 11, at a point 19 between the condenser 10 and the resistor 14. The inductance at its other side is connected, as by a conductor 20, to the anode 21 of a four-electrode Thyratron 22, the cathode 23 thereof being connected, as by a conductor 24, to the condenser charging circuit 11, at a point 25 between the condenser 10 and the resistor 15.

Serially connected between the conductors 18, 24, are fixed and variable resistors 26, 27, in shunting relation to the condenser 10. The control grid 28 of the Thyratron 22 is connected as by conductor 29 and resistor 30 to a point 31 between the fixed and variable resistors 26, 27. The shield grid 32 of the Thyratron is connected as by conductor 33, to a point 34 in the condenser charging circuit between the resistor 15 and the current source 12 at its negative side.

Upon closing the switch 13, current will flow from the source 12 through the resistors 14, 15 to charge the condenser 10. Current will also flow through the resistors 26, 27 shunting the condenser. The voltage drop across the resistor 15 provides a bias of the shield grid 32 with respect to the cathode 23. This bias is highly negative as the condenser commences charging but decreases toward the critical voltage of the grid 32 as the condenser charge increases. The voltage drop across the resistor 27 provides a bias of the control grid 28 with respect to the cathode 23, and this bias is increasingly positive as the condenser charge increases. The voltage drop across the resistors 26, 27 provides a bias of the anode 21 with respect to the cathode 23, this bias being increasingly positive as the condenser charges.

When the plate voltage rises to a sufficiently high value and the grid voltages reach critical values, the Thyratron will ignite, thus permitting the condenser 10 to discharge through the inductance 17. The anode voltage then becomes negative; the tube is extinguished and the inverter is ready for another cycle of operation.

Since the resistor 14 has a value many times greater than that of the resistor 15, the time constant of the condenser charging circuit depends mainly on the values of the condenser 10 and the resistor 14. When it is desired to change the frequency of the inverter, the resistor 14 is varied and the resistors 15, 27 are readjusted so that the tube will not fire at too low a voltage. Reducing the value of the resistor 14 increases the rate of charge of the condenser and therefore the frequency of the inverter. Thus, the frequency is easily adjustable, while maintaining a high output, which may be taken off at opposite sides of the inductance 17, through conductors 35, 36 and condensers 37, 38. The frequency of the inverter is however, highly stable and is affected only by changes in the resistors, or by variations in the tube characteristics or supply voltage.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. In a self-excited relaxation inverter, a condenser, a source of direct current, a condenser charging circuit including a variable resistor connecting the condenser to the negative side of said current source, a gas tube having a cathode, an anode, a control grid, and a shield grid, an oscillatory circuit including said condenser and bridging said cathode and anode, means including a voltage divider shunting the condenser for supplying positive bias voltages from said source to said anode and said control grid, and means including said variable resistor in the condenser charging circuit for supplying a negative bias voltage from said source to said shield grid, said positive and negative bias voltages depending on the condition of charge of said condenser and said grid biasing voltages approaching definite critical values at which said tube becomes conductive as the charge of the condenser approaches a predetermined value.

2. In a self-excited relaxation inverter, a condenser, a source of direct current, a condenser charging circuit including a first variable resistor connecting the condenser to the negative side of said current source and a second variable resistor, a gas tube having a cathode, an anode, a control grid, and a shield grid, an oscillatory circuit including said condenser and bridging said cathode and anode, means for supplying to said anode and control grid positive bias voltages increasing as the charge on said condenser increases, including a variable voltage divider shunting said condenser, and means for supplying to the shield grid a negative bias voltage decreasing as the charge on said condenser increases including said first variable resistor, said voltages reaching a critical relation so as to start the flow of anode current as the charge of the condenser reaches a predetermined value.

HENRY CARLETON.